(12) United States Patent
Huang (10) Patent No.: US 11,833,465 B2
(45) Date of Patent: Dec. 5, 2023

(54) HIGH EFFICIENCY AIR FILTER DEVICE AND OPERATING METHOD THEREOF

(71) Applicant: FOSHAN HUMAN HABITAT ENVIRONMENTAL PROTECTION ENGINEERING CO., LTD., Foshan (CN)

(72) Inventor: Qingbao Huang, Foshan (CN)

(73) Assignee: FOSHAN HUMAN HABITAT ENVIRONMENTAL PROTECTION ENGINEERING CO., LTD., Guangdong (CN)

( * ) Notice: Subject to any disclaimer, the term of this patent is extended or adjusted under 35 U.S.C. 154(b) by 610 days.

(21) Appl. No.: 16/086,940

(22) PCT Filed: Aug. 18, 2016

(86) PCT No.: PCT/CN2016/095810
§ 371 (c)(1),
(2) Date: Sep. 20, 2018

(87) PCT Pub. No.: WO2017/161801
PCT Pub. Date: Sep. 28, 2017

(65) Prior Publication Data
US 2019/0091619 A1    Mar. 28, 2019

(30) Foreign Application Priority Data
Mar. 23, 2016  (CN) .......................... 201610173471.1

(51) Int. Cl.
*B01D 46/42*  (2006.01)
*B01D 46/02*  (2006.01)
(Continued)

(52) U.S. Cl.
CPC ........... *B01D 46/023* (2013.01); *B01D 46/02* (2013.01); *B01D 46/04* (2013.01); *B01D 46/446* (2013.01);
(Continued)

(58) Field of Classification Search
CPC ...... B01D 46/02; B01D 46/023; B01D 46/04; B01D 46/002; B01D 46/0026;
(Continued)

(56) References Cited

U.S. PATENT DOCUMENTS 4,764,190 A * 8/1988 Israelson ............ B01D 46/4218
55/282.1
4,889,698 A * 12/1989 Moller .................... B01D 53/56
95/134

(Continued)

FOREIGN PATENT DOCUMENTS

CN    102179114 A    9/2011
CN    103212249 A    7/2013
(Continued)

OTHER PUBLICATIONS

Espacenet translation of CN 204170537 U.*
(Continued)

*Primary Examiner* — Jonathan Luke Pilcher
(74) *Attorney, Agent, or Firm* — McDonnell Boehnen Hulbert & Berghoff LLP (57) ABSTRACT

An air filter device and an operating method thereof. The air filter device comprises an air filter system and a powder distribution system. The air filter system comprises an air filter chamber (1), a clean air chamber (2), and a high-pressure jet pulse powder cleaning device (3). An entrance of the air filter chamber (1) is in communication with an air inlet pipe (4); an exit of the clean air chamber (2) is in communication with an air outlet pipe (6), and the air outlet
(Continued)

pipe (6) is in communication with an exhaust fan (9). A plurality of bag filters or filter cartridges (10) are disposed in the air filter chamber (1). An opening end of each of the bag filters or filter cartridges (10) is in communication with the clean air chamber (2), and high-pressure jet pulse powder cleaning devices (3) are disposed above the opening end of the corresponding bag filters or filter cartridges (10). The powder distribution system includes a powder storage tank (13), which is in communication, via a powder delivery tube (15), with the air inlet pipe (4) of the air filter chamber (1). The operating method comprises a first powder distribution step and a second powder distribution step, which are respectively performed according to pressure detection status of the air filter chamber (1).

4 Claims, 2 Drawing Sheets (51) Int. Cl.
B01D 46/58 (2022.01)
B01D 46/71 (2022.01)
B01D 46/62 (2022.01)
B01D 46/04 (2006.01)
B01D 46/44 (2006.01)
B01D 46/46 (2006.01)

(52) U.S. Cl.
CPC .......... B01D 46/46 (2013.01); B01D 46/58 (2022.01); B01D 46/645 (2022.01); B01D 46/71 (2022.01); B01D 2273/12 (2013.01); F23J 2219/60 (2013.01)

(58) Field of Classification Search
CPC .. B01D 46/24; B01D 46/446; B01D 46/2407; B01D 29/0065; B01D 53/81; B01D 53/82; B01D 53/83; F23J 2219/30; F23J 2219/60
See application file for complete search history.

(56) References Cited

U.S. PATENT DOCUMENTS

| | | | |
|---|---|---|---|
| 4,909,814 A * | 3/1990 | Sisk | B01D 46/00 55/528 |
| 5,238,665 A * | 8/1993 | Lerner | B01D 53/346 423/245.3 |
| 5,569,436 A * | 10/1996 | Lerner | B01D 53/81 95/134 |
| 5,607,654 A * | 3/1997 | Lerner | F23J 15/006 423/245.3 |
| 5,868,807 A * | 2/1999 | Luy | B01D 46/0079 55/302 |
| 6,579,507 B2 * | 6/2003 | Pahlman | B01D 53/8628 423/244.01 |
| 8,961,912 B2 * | 2/2015 | Allebach | B01D 53/504 423/244.01 |
| 9,539,538 B2 * | 1/2017 | Wong | B01D 53/8665 |
| 2002/0150516 A1 * | 10/2002 | Pahlman | B01D 53/8609 423/247 |
| 2008/0031972 A1 * | 2/2008 | Sonobe | C01B 32/336 423/445 R |
| 2013/0109562 A1 * | 5/2013 | Wong | B01D 53/8665 502/181 |
| 2013/0291725 A1 * | 11/2013 | Lesniak | B01D 53/14 96/243 |
| 2015/0238890 A1 * | 8/2015 | Hjelmberg | B01D 46/0295/26 |
| 2015/0283500 A1 * | 10/2015 | Butz | F23J 15/02 422/177 |
| 2016/0045862 A1 * | 2/2016 | Chothani | F23J 15/003 423/210 |

FOREIGN PATENT DOCUMENTS

| | | |
|---|---|---|
| CN | 103463896 A | 12/2013 |
| CN | 203436975 U | 2/2014 |
| CN | 203862034 U | 10/2014 |
| CN | 204170537 U | 2/2015 |
| CN | 204380439 U | 6/2015 |
| CN | 104888543 A | 9/2015 |
| CN | 105797499 A | 7/2016 |
| CN | 205516952 U | 8/2016 |
| KR | 20140110495 A | 9/2014 |

OTHER PUBLICATIONS

"Flue Gas Scrubbing Systems", Consutech.com, Jul. 4, 2008 (date obtained via WaybackMachine), http://www.consutech.com/apc.htm.*

Qiong Cai, Zheng-Hong Huang, Feiyu Kang, Jun-Bing Yang, Preparation of activated carbon microspheres from phenolic-resin by supercritical water activation, Carbon, vol. 42, Issue 4, 2004, pp. 775-783, ISSN 0008-6223, https://doi.org/10.1016/j.carbon.2004.01.042.*

Chinese Office Action of priority application No. 201610173471.1, dated Sep. 7, 2017, pp. 1-7.

PCT International Search Report, for International Application No. PCT/CN2016/095810, dated Dec. 16, 2016, pp. 1-7.

* cited by examiner

Fig. 1

Fig. 2

HIGH EFFICIENCY AIR FILTER DEVICE AND OPERATING METHOD THEREOF

CROSS-REFERENCE

This application is a section 371 national phase application based on PCT/CN2016/095810, filed Aug. 18, 2016, which claims priority to Chinese Patent Application No. 201610173471.1, filed Mar. 23, 2016, which are incorporated by reference in their entirety.

FIELD OF THE INVENTION

The present invention belongs to the technical field of gas filtering, and in particular, relates to an air filter device and an operating method thereof.

BACKGROUND ART

Conventional air filters are generally made up of one or more filter units connected in parallel, and the one or more filter units include consistent materials, filtration accuracy, and geometrical configuration. The air filter unit is generally square, and each square air filter unit is composed of an outer frame, filter material, a fixture, a septum device and a sealing device. Filter materials generally include filter cotton, rayon, polyester synthetic fiber, glass fiber paper or the like, and filter materials generally adopt dense folding structures.

When dust is filtered and collected on the outer surface of the filter material, the dust quantity increases and thickens over time, and the resistance of the air filter material continues to increase until it exceeds the rated resistance of the air filter, resulting that the air filter cannot be used and must be replaced with a new air filter unit. The single-use characteristic of the air filter unit brings about the shortcomings of the conventional air filter unit, such as short service life, high replacement frequency, as well as the shortcomings of the conventional air filter, such as high cost of both consumables and manual maintenance.

In order to improve the filtration efficiency, a conventional air filtration mode generally adopts a 3-stage series combined filtration mode, i.e., a first-stage primary-efficiency air filter, a second-stage intermediate-efficiency air filter and a third-stage high-efficiency air filter. If users' requirement for air quality is not high, as with the case of central air conditioning air filtration in a general workshop, it is also possible to use only a series combination of a first-stage primary-efficiency air filter and a second-stage intermediate-efficiency air filter. The initial resistance and the final resistance of a 3-stage combined filter mode are generally as follows: the initial resistance-the final resistance of the first-stage primary-efficiency air filter is 50-400 Pa; the initial resistance-the final resistance of the second-stage intermediate-efficiency air filter is 70-600 Pa; the initial resistance-the final resistance of the third-stage high-efficiency air filter is 80-700 Pa; and a total initial resistance-a total final resistance of the 3-stage combined filter mode is 200-1700 Pa.

Hence, the total final resistance value of the conventional air filtration mode is generally 1700 Pa, and therefore, the conventional air filtration mode has a defect of high energy consumption. The total resistance difference of the conventional air filtration mode ranges from 0 to 1500 Pa, resulting that the conventional air filtration mode has disadvantages of the resistance value fluctuating greatly and poor operational stability.

SUMMARY OF THE INVENTION

The technical problem to be solved by the present invention, with respect to the deficiencies of the prior art, is to provide an air filter with high efficiency, low energy consumption, ultra stability and long service life and a operating method thereof.

The technical problems to be solved by the present invention are realized by using the following technical solutions.

A high efficiency air filter device includes an air filter system and a powder distribution system:

wherein the air filter system includes an air filter chamber, a clean air chamber, high-pressure jet pulse powder cleaning devices; an entrance of the air filter chamber is in communication with an air inlet pipe; an air inlet pipe valve is disposed on the air inlet pipe; an exit of the clean air chamber is in communication with an air outlet pipe; a pressure detector and an air outlet pipe valve are disposed on the air outlet pipe, and the air outlet pipe is in communication with an exhaust fan; a plurality of bag filters or filter cartridges are disposed in the air filter chamber; an opening end of each of the bag filters or filter cartridges is in communication with the clean air chamber, and each of the high-pressure jet pulse powder cleaning devices is disposed above the opening end of the corresponding bag filter or filter cartridge; a powder precipitation chamber is disposed at a lower end of the air filter chamber, and a powder discharge valve is disposed at a lower end of the powder precipitation chamber;

the powder distribution system includes a powder storage tank filled therein with artificially prepared powder particles; a high-pressure air pipe is disposed in the powder storage tank; the powder storage tank is in communication, via a powder delivery tube, with the air inlet pipe of the air filter chamber; a high-pressure air pipe valve is disposed at an air inlet end of the high-pressure air pipe, and a powder delivery tube valve is disposed on the powder delivery tube. The diameter of the artificially prepared powder particle is greater than the filtration precision of the filter cloth.

Further, the air filter system further includes an air baffle disposed in front of the entrance of the air filter chamber, a trumpet-shaped air intake disposed at an air inlet end of the air inlet pipe, and a filter mesh disposed on the air intake. The powder delivery tube of the powder distribution system stretches into a middle position inside the air inlet pipe. A nozzle is disposed at a powder outlet end of the powder delivery tube, and a baffle is disposed in front of the nozzle.

The pressure detector, a switch of the air inlet pipe valve, a switch of the air outlet pipe valve, a switch of the air jetting pipe, and a switch of the powder delivery tube valve are electrically connected to a PLC control system, respectively. The air outlet of the exhaust fan is in communication with the second-stage air filter device.

Figure 1:
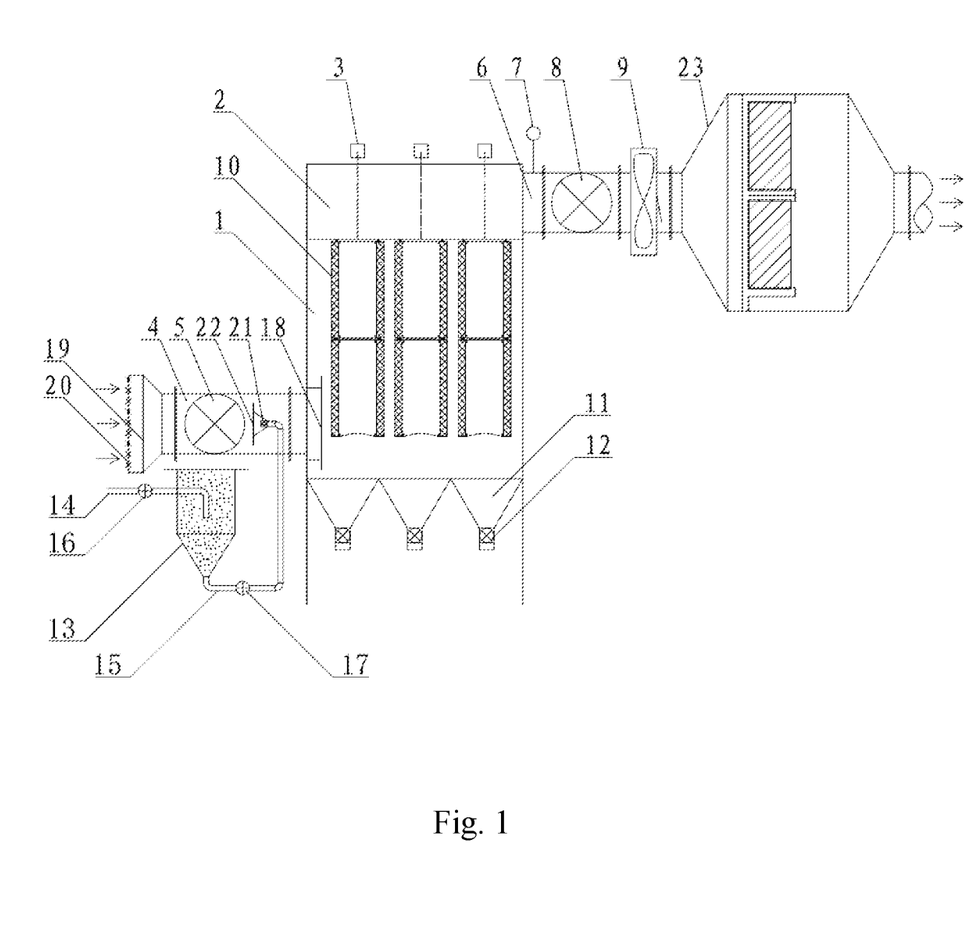

The present invention also provides an operating method of the high efficiency air filter device:

$P_0$ is set as an original resistance value of the filter cloth, $P_1$ as a resistance value of a artificially prepared powder layer, and $P_2$ as a resistance value of an air dust layer, so an initial resistance value $P_3$ of the air filter chamber is $P_0+P_1$, and a final resistance value $P_4$ of the air filter chamber is $P_0+P_1+P_2$;

before the high efficiency air filter device starts operating, a first powder distribution operation is performed, and the steps are as follows:

A1: turning on the exhaust fan, the air inlet pipe valve, the air outlet pipe valve, the high-pressure air pipe valve, and the powder delivery tube valve, such that the artificially prepared powder particles filled in the powder storage tank may enter the air inlet pipe via the powder delivery tube, and then are sucked into the air filter chamber, and are adsorbed on the outer surface of the bag filters or filter cartridges;

A2: keeping the exhaust fan operating, turning off the air inlet pipe valve, the air outlet pipe valve, the high-pressure air pipe valve, and the powder delivery tube valve, when the pressure detector on the air outlet pipe detects that negative pressure value in the air filter chamber reaches the set initial resistance value $P_3$;

A3: starting the high-pressure jet pulse powder cleaning devices, jetting for a set time period ΣT so as to clean a the powder particle layer adsorbed on the outer surface of the bag filters or filter cartridges and to disperse the powder particles in the air filter chamber;

A4: after jetting for the set time period ΣT, closing the high-pressure jet pulse powder cleaning devices, and then waiting for the set time period ΔT, such that the powder particles may be evenly distributed in the air filter chamber;

A5: after waiting for the set time period ΔT, turning on the air inlet pipe valve and the air outlet pipe valve, such that the powder particles dispersed in the air filter chamber may be evenly adsorbed and distributed on the outer surface of the filter cartridges;

A6: detecting pressure and performing respective process according to the pressure status:

A6-1: when the pressure detector on the air outlet pipe detects that the negative pressure value in the air filter chamber reaches the set initial resistance value $P_3$, turning on the air inlet pipe valve and the air outlet pipe valve again so as to enable the high efficiency air filter device into a normal operating state;

A6-2: when the pressure detector on the air outlet pipe detects that the negative pressure value in the air filter chamber does not reach the set initial resistance value $P_3$, performing steps A1 to A5 again, detecting the pressure again until it reaches the set initial resistance value $P_3$, and then enabling the high efficiency air filter device into a normal operating state;

after the high efficiency air filter device operates normally for a period, when the pressure detector detects that the negative pressure value in the air filter chamber exceeds the set final resistance value $P_4$, keeping operating the exhaust fan, turning off the air inlet pipe valve and the air outlet pipe valve, and performing the following steps:

B1: starting the high-pressure jet pulse powder cleaning devices to perform for a set jetting time period ΣT so as to clean the powder particle layer (including air dust particles and artificially prepared powder particles) adsorbed on the outer surface of the bag filters or filter cartridges and to disperse the particles in the air filter chamber;

B2: after the set jetting time period ΣT, closing the high-pressure jet pulse powder cleaning devices, and then performing for the set waiting time period ΔT to precipitate larger and heavier powder particles into the powder precipitation chamber under the gravity field;

B3: after the set waiting time period ΔT, turning on the air inlet pipe valve and the air outlet pipe valve, such that the powder particles dispersed in the air filter chamber may be evenly adsorbed and distributed on the outer surface of the bag filters or filter cartridges;

B4: detecting pressure and performing respective process according to the pressure status:

B4-1: when the pressure detector on the air outlet pipe detects that the negative pressure value in the air filter chamber reaches the set initial resistance value $P_3$, turning on the air inlet pipe valve and the air outlet pipe valve again so as to enable the high efficiency air filter device into a normal operating state;

B4-2: when the pressure detector on the air outlet pipe detects that the negative pressure value in the air filter chamber does not reach the set initial resistance value $P_3$, performing a second powder distribution operation, the steps of which are the same as steps A1 to A5 of the first powder distribution, then detecting the pressure again until it reaches the set initial resistance value $P_3$, so as to enable the high efficiency air filter device into a normal operating state;

B4-3: when the pressure detector on the air outlet pipe detects that the negative pressure value in the air filter chamber exceeds the set initial resistance value $P_3$, turning off the air inlet pipe valve and the air outlet pipe valve, performing steps B1 to B3 again, detecting the pressure again until it meets the set initial resistance value $P_3$, and then enabling the high efficiency air filter device into a normal operating state.

The resistance value $P_1$ of the artificially prepared powder layer is ranged from 100 Pa to 500 Pa, and the resistance value $P_2$ of the air dust layer is ranged from 100 Pa to 500 Pa. As a result, the initial resistance value $P_3$ of the air filter chamber is set as $P_0$+150 Pa to 500 Pa, and the final resistance value $P_4$ of the air filter chamber is set as $P_0$+200 Pa to 1000 Pa.

A group of high efficiency air filter devices is composed of two or more of the high efficiency air filter devices communicated in parallel. When powder distribution is performed while valves of the air inlet pipe and the clean air outlet pipe of one high efficiency air filter device are turned off, air filtration is performed when valves of the air inlet pipe and the clean air outlet pipe of other high efficiency air filter devices are turned on. With such repeated cycles, the group of high efficiency air filter devices may continuously perform air filtration operation.

The device of the present invention is particularly applicable to air filtration in industrial, commercial and special occasions, such as air filtration in special environments such as central air conditioners of ultra-clean workshops, clean workshops, and other workshop, central air conditioners in office buildings, hotels and hospitals and gas turbines, etc, thereby achieving good effects of high efficiency, low energy consumption, ultra stability, and long service life.

The present invention will be further described in detail below with reference to the accompanying drawings and specific embodiments.

DESCRIPTION OF ATTACHED DRAWINGS

FIG. 1 is s schematic structural diagram of the present invention; and

FIG. 2 is a schematic diagram of a combined air filter system.

DETAILED DESCRIPTION OF PREFERRED EMBODIMENTS

FIG. 1 is s schematic structural diagram of the present invention. As shown in the figure, the structure includes an air filter system and a powder distribution system. The air filter system includes an air filter chamber 1, a clean air chamber 2, and high-pressure jet pulse powder cleaning devices 3. An entrance of the air filter chamber 1 is in communication with an air inlet pipe 4; an air inlet pipe valve 5 is disposed on the air inlet pipe 4; an exit of the clean air chamber 2 is in communication with an air outlet pipe 6; a pressure detector 7 and an air outlet pipe valve 8 are disposed on the air outlet pipe 6, and the air outlet pipe 6 is in communication with an exhaust fan 9; a plurality of bag filters or filter cartridges 10 are disposed in the air filter chamber 1. An opening end of each of the bag filters or filter cartridges 10 is in communication with the clean air chamber 2, and each of the high-pressure jet pulse powder cleaning devices 3 is disposed above the opening end of the corresponding bag filter or filter cartridge 10; a powder precipitation chamber 11 is disposed at a lower end of the air filter chamber 1, and a powder discharge valve 12 is disposed at a lower end of the powder precipitation chamber 11.

The powder distribution system includes a powder storage tank 13, and the powder storage tank 13 is filled therein with artificially prepared powder particles. A high-pressure air pipe 14 is disposed in the powder storage tank 13, and the powder storage tank 13 is in communication, via a powder delivery tube 15, with the air inlet pipe 4 of the air filter chamber 1. A high-pressure air pipe valve 16 is disposed at an air inlet end of the high-pressure air pipe 14, and a powder delivery tube valve 17 is disposed on a powder delivery tube 15.

The artificially prepared powder particles in the powder storage tank 13 has a spherical shape (or as spherical as possible), or has an irregular shape, and the particle diameter is greater than the filtration precision of the filter cartridge. The type, composition, specific gravity, particle shape, particle diameter range, particle size distribution state, and ratio of powder type of the powder particles are artificially selected in advance. The conditions for the medium of artificial prepared powder includes: (1) small specific gravity, which is beneficial for suspension; (2) small particle size and relatively circular shape, for which since the artificial powder medium field depends on the filter cloth of the filter filters or filter cartridges, the particle diameter of the powder is greater than the filtration precision of the filter cloth, and if the filtration precision of the filter cloth is ≥0.5 μm and the filtration efficiency is ≥99.99%, the basic particle diameter of the powder is to be ≥0.5 μm; (3) the particle size distribution state conforming to the close stacking law; and (4) the proportion and type of powder meeting actual needs.

An air baffle 18 is disposed in front of an entrance of the air filter chamber 1 so as to disperse the air flow and artificially prepared powder particles that enter the air filter chamber. A trumpet-shaped air intake 19 is disposed at an air inlet of the air inlet pipe 4, and a filter mesh 20 is disposed on the air intake 19, so as to filter larger impurity particles in the air. The powder delivery tube 15 of the powder distribution system stretches into a middle position inside the air inlet pipe 4, and a nozzle 21 is disposed at a powder outlet end of the powder delivery tube 15. In order to disperse the powder particles evenly, a baffle 22 is disposed in front of the nozzle 21.

In order to realize automatic control, the pressure detector 7, a switch of the air inlet pipe valve 5, a switch of the air outlet pipe valve 7, a switch of the high-pressure air pipe valve 16, and a switch of the powder delivery tube valve 17 are electrically connected to a PLC control system, respectively. The pressure detector inputs the negative pressure value signal of the air filter chamber to the PLC control system, and the system controls on/off of the above respective valves according to the set initial resistance value and the final resistance value.

To realize higher filtration precision, the air outlet of the exhaust fan 9 may be in communication with the second-stage air filter device 23.

Now, the operating method of the device of the present invention is further described.

Before the high efficiency air filter device starts operating, a first powder distribution operation is performed, and the steps are as follows:

A1: turning on the exhaust fan 9, the air inlet pipe valve 5, the air outlet pipe valve 8, the high-pressure air pipe valve 16, and the powder delivery tube valve 17, such that the artificially prepared powder particles filled in the powder storage tank 13 enter the air inlet pipe 4 via the powder delivery tube 15, and then are sucked into the air filter chamber 1, and are adsorbed on the outer surface of the bag filters or filter cartridges 10.

During this process, the artificially prepared powder particles may reach the nozzle 21 via the powder delivery tube 15 and are jetted at a high speed so as to be reversely dispersed into the air inlet pipe 4 under the blocking by the nozzle baffle 22. At this time, the air inlet pipe 4 is in a negative pressure and air intake state. Driven by the negative pressure, the artificially prepared powder particles are dispersed again under the block by the air inlet baffle 18, and reach the outer surface of the bag filters or filter cartridges 9 of the air filter chamber 1 along with the air, so as to initially form a manual powder medium field. However, at this time, the manual powder medium is not distributed evenly.

A2: When the pressure detector 7 on the air outlet pipe 6 detects that negative pressure value in the air filter chamber 1 reaches the set initial resistance value $P_3$, keep the exhaust fan 9 operating, turn off the air inlet pipe valve 5, the air outlet pipe valve 8, the high-pressure air pipe valve 16, and the powder delivery tube valve 17.

The artificially prepared powder particle type and the thickness of the medium layer formed on the outer surface of the filter cartridge are determined by two factors of clean air quality requirements and economic degrees. The type of artificially prepared powder particles may be selected in advance and the thickness may reflect the thickness of the medium layer using the negative pressure value of the air filter chamber 1. With the higher clean air quality requirement and the larger set negative pressure, the thickness of the powder layer is thicker, the operating resistance is greater, and the operating cost is higher, and vice versa.

$P_0$ is set as an original resistance value of the filter cloth, $P_1$ as a resistance value of a artificially prepared powder layer, and $P_2$ as a resistance value of an air dust layer, so an initial resistance value $P_3$ of the air filter chamber is $P_0+P_1$, and a final resistance value $P_4$ is $P_0+P_1+P_2$. If an original resistance value $P_0$ of the filter cloth is 100 Pa, a resistance value $P_1$ of the artificially prepared powder layer is 250 Pa, and a resistance value $P_2$ of the air dust layer is 250 Pa, the set initial resistance value $P_0$ is 100 Pa+250 Pa=350 Pa, and the set final resistance value $P_4$ is 100 Pa+250 Pa+250 Pa=600 Pa.

Experiments show that the device of the present invention has a better comprehensive benefit when the resistance value $P_3$ of the artificially prepared powder layer is ranged from 100 Pa to 500 Pa, and the resistance value $P_2$ of the air dust layer is ranged from 100 Pa to 500 Pa, i.e., the resistance value of $P_1+P_2$ is ranged from 200 to 1000 Pa. The device of the present invention has a better comprehensive benefit when the resistance value $P_1$ of the artificially prepared powder layer is ranged from 150 Pa to 300 Pa, and the resistance value $P_2$ of the air dust layer is ranged from 150 Pa to 300 Pa, i.e., the resistance value of $P_1+P_2$ is ranged from 300 to 600 Pa.

A3: Start the high-pressure jet pulse powder cleaning devices 3 to jet for the set time period $\Sigma T$ so as to clean the powder particle layer adsorbed on the outer surface of the bag filters or filter cartridges 10 and to disperse the powder particles in the air filter chamber 1.

A4: After jetting for the set time period $\Sigma T$, close the high-pressure jet pulse powder cleaning devices 3 and wait for a set time period $\Delta T$, such that the powder particles may be evenly distributed in the air filter chamber 1.

A5: After waiting for the set time period $\Delta T$, turn on the air inlet pipe valve 5 and the air outlet pipe valve 8, such that the powder particles dispersed in the air filter chamber 1 may be evenly adsorbed and distributed on the outer surface of the filter cartridges 9;

The above set jetting time period $\Sigma T$ is $[n(t_1+t_2)+t_3]x$, in which a pulse width $t_1$ is 80 to 120 milliseconds; a pulse interval $t_2$ is 1- to 20 seconds; the number of the pulse jetting devices is n; a small cycle interval $t_3$ is 1 to 20 seconds, and the number of small cycle x is 1 to 2. The set waiting time period $\Delta T$ is 0 to 86400 seconds, and the best range is 0 to 1800 seconds.

A6: Detect pressure and perform respective process according to the pressure status.

A6-1: When the pressure detector 7 on the air outlet pipe 6 detects that the pressure value (the negative pressure value) in the air filter chamber 1 reaches the set initial resistance value $P_3$, turn on the air inlet pipe valve 5 and the air outlet pipe valve 8 again so as to enable the high efficiency air filter device into a normal operating state. If the set initial resistance value $P_3$ is 350 Pa, when the detected negative pressure value of the air filter chamber is 350 Pa or closes to 350 Pa, it indicates that the initial powder distribution reaches requirements and the operation may be started.

A6-2: When the pressure detector 7 on the air outlet pipe 6 detects that the negative pressure value in the air filter chamber 1 does not reach the set initial resistance value $P_3$, perform steps A1 to A5 again, then detect the pressure again until it reaches the set initial resistance value $P_1$, and then enable the high efficiency air filter device into a normal operating state. If the detected negative pressure value of the air filter chamber is 300 Pa, which does not reach the set 350 Pa, it indicates that the thickness of the powder layer of the initial powder distribution is not enough, and it is necessary to replenish the powder. When the pressure value reaches the set initial resistance value, the operation starts.

After the high efficiency air filter device operates normally for a period, when the pressure detector 7 detects that the negative pressure value in the air filter chamber 1 exceeds the set final resistance value $P_4$, for example, when the set final resistance value $P_4$ is 600 Pa, while the actually detected final resistance value is 630 Pa, keep operating the exhaust fan 9, turn off the air inlet pipe valve 5 and the air outlet pipe valve 8, and perform the following steps.

B1: start the high-pressure jet pulse powder cleaning devices 3 to perform for a set jetting time period ΣT so as to clean the powder particle layer (including air dust particles and artificially prepared powder particles) adsorbed on the outer surface of the bag filters or filter cartridges 10 and to disperse the particles in the air filter chamber 1;

B2: after the set jetting time period ΣT, close the high-pressure jet pulse powder cleaning devices 3, and then perform for the set waiting time period ΔT, such that larger and heavier powder particles may precipitate into the powder precipitation chamber 11 under the gravity field;

B3: after the set waiting time period ΔT, turn on the air inlet pipe valve 5 and the air outlet pipe valve 8, such that the powder particles dispersed in the air filter chamber 1 may be evenly adsorbed and distributed on the outer surface of the bag filters or filter cartridges 10;

B4: detect pressure and perform respective process according to the pressure status:

B4-1: when the pressure detector 7 on the air outlet pipe 6 detects that the negative pressure value in the air filter chamber 1 reaches the set initial resistance value $P_3$, it indicates that after gravity precipitation for a period of ΣT+ΔT, the loss of the artificially prepared powder medium (since the collision or adsorption or static electricity between the artificially prepared powder, and between the artificially prepared powder and the fine-ultrafine dust in the air, these powder and dust may be bonded or agglomerated to precipitate, via gravity precipitation, into the powder precipitation chamber) and supplement of the newly added fine-ultrafine dust in the air (the heavy and coarse may precipitate, via gravity precipitation, into the powder precipitation chamber, or since the collision or adsorption or static electricity between the fine-ultrafine dust in the air, the dust may be bonded or agglomerated to precipitate, via gravity precipitation, into the powder precipitation chamber, while the light and fine may suspend in the air) are equivalent, and a second powder distribution is no longer needed. Then, turn on the air inlet pipe valve 5 and the air outlet pipe valve 8 again, so as to enable the high efficiency air filter device into a normal operating state;

B4-2: when the pressure detector 7 on the air outlet pipe 6 detects that the negative pressure value in the air filter chamber 1 does not reach the set initial resistance value $P_3$, for example, if the detected negative pressure value of the air filter chamber is 300 Pa, which does not reach the set 350 Pa, it indicates that after gravity precipitation for a period of ΣT+ΔT, the loss of the artificially prepared powder medium is not equivalent to the supplement of the newly added fine-ultrafine dust, and the loss is more and the supplement is less. Therefore, it indicates that the collision or adsorption or static electricity between the artificially prepared powder, between the fine-ultrafine dust, and between the artificially prepared powder and the fine-ultrafine dust in the air leads to severe bonding and agglomeration or there is more heavy and coarse fine-ultrafine dust in the air. The reason for such phenomenon is that ΔT is relatively so long that the gravity precipitation is more than necessary, and a second powder distribution operation needs to be performed. The steps thereof are the same as steps A1 to A5 of the first powder distribution step, and the gravity precipitation time ΔT is properly shortened. Then, the pressure is detected again until it reaches the set initial resistance value $P_3$, and the air filter device is enabled into a normal operating state;

B4-3: when the pressure detector 7 on the air outlet pipe 6 detects that the negative pressure value in the air filter chamber 1 exceeds the set initial resistance value $P_3$, for example, if the detected negative pressure value of the air filter chamber is 450 Pa, which is greater than the set 350 Pa, it indicates that after gravity precipitation for a period of ΔT, loss of the artificially prepared powder is not equivalent to the supplement of the added fine-ultrafine dust in the air, and the loss is less and the supplement is more. Therefore, it indicates that collision or adsorption or static electricity between the artificially prepared powder, between the fine-ultrafine dust, and between the artificially prepared powder and the fine-ultrafine dust in the air leads to weak bonding and agglomeration or there is more light and fine fine-ultrafine dust in the air. The main reason causing such phenomenon is that ΔT is short, so that the gravity precipitation is weak and the suspension is strong. Therefore, the air inlet pipe valve 5 and the air outlet pipe valve 8 must be turned off, and then steps B1 to B3 are performed again while properly extending the gravity precipitation time ΔT. Here, the processes of B1 to B3 may be repeated for n times, that is, the number of ΔT is n, and ΔT may be adjusted according to experience so as to reduce repetition times as much as possible. Then, the pressure is detected again until it meets the set initial resistance value $P_3$, so as to enable the high efficiency air filter device into a normal operating state.

For the purpose of continuous air filtration operation of the device of the present invention, it is possible to configure a group of high efficiency air filter devices from two or more the high efficiency air filter devices communicated in parallel. When powder distribution is performed while valves of the air inlet pipe and the clean air outlet pipe of one high efficiency air filter device are turned off, air filtration is performed when valves of the air inlet pipe and the clean air outlet pipe of other high efficiency air filter devices are turned on. With such repeated cycle, the group of high efficiency air filter devices may continuously perform air filtration operation, as shown in FIG. 2.

Figure 2:
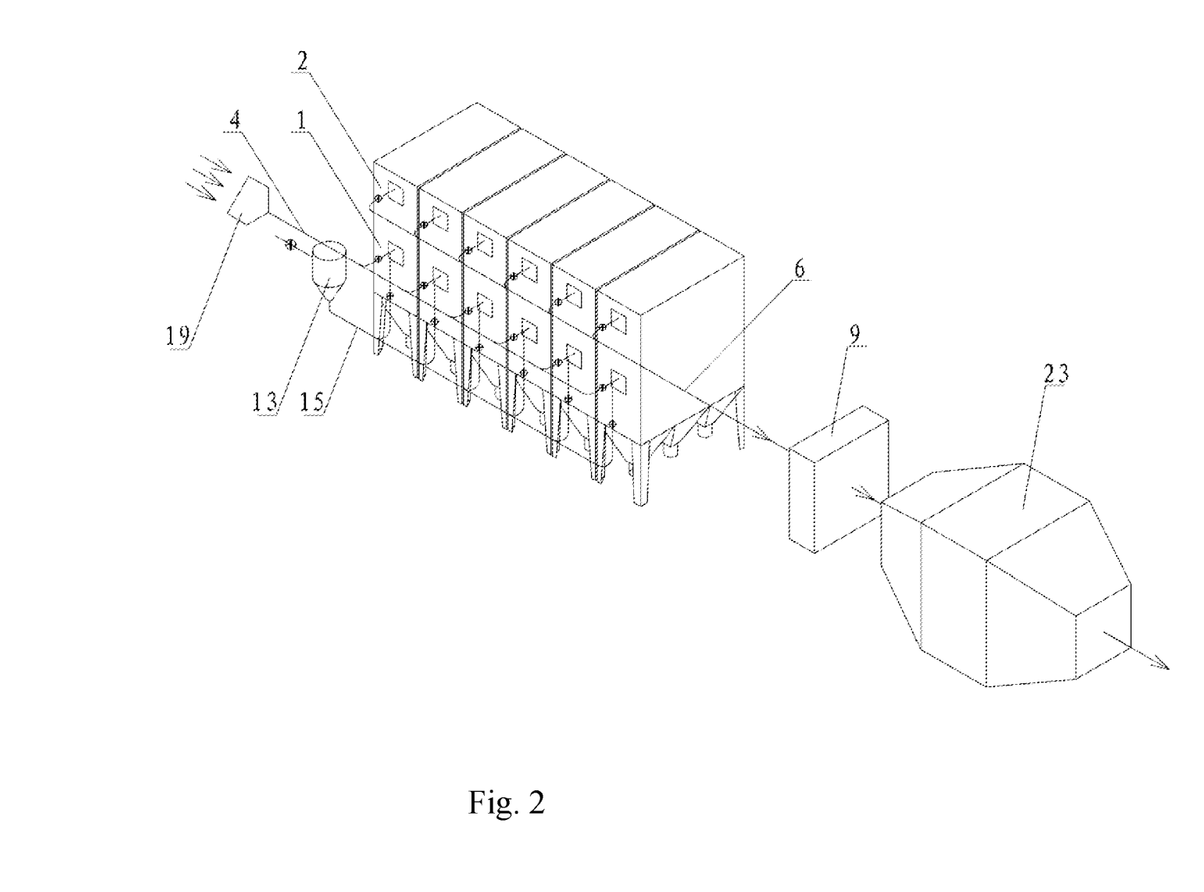

FIG. 2 is a schematic diagram of a combined air filter system. As shown in the figure, the air inlet pipe 4, the air outlet pipe 6, and the powder delivery tube 15 are respectively in parallel connection with six devices of the present invention. The air inlet pipe 4 is in parallel connection with six air filter chambers 1, and the air outlet pipe 6 is in parallel connection with six corresponding clean air chambers 2. The powder delivery tube 15 of the powder storage tank 13 is in parallel connection with the air inlet pipes of six corresponding air filter chambers 1, and the device of the present invention is in series connection with the exhaust fan 9 and the second-stage air filter device 23. The function of the second-stage air filter device is to further improve the air filtration precision, and the device may be an existing conventional air filter.

An advantage of the present invention is to use the medium field to effectively improve filtration precision. Since the artificially prepared powder particles are subject to multiple times of powder distribution process, the particles may be evenly distributed on the outer surface of the filter cloth composing the bag filters or filter cartridges and are stacked according to the natural close stacking law. Therefore, the meager artificial powder medium field is filled with multi-layered and interconnected fine-ultrafine pores, and each fine-ultrafine pore is filled with micro-electric fields, micro-adsorption fields. In this manner, a powder medium field with excellent gas permeability and excellent filtration performance is formed. When the fine-ultrafine dust in the air reaches the artificial powder medium field, firstly, it is intercepted and filtered by the multi-layered and interconnected fine-ultrafine pores in the artificial powder medium field; secondly, it is adsorbed and filtered or exclusively filtered by the micro-electrical field between the multi-layered fine-ultrafine pores in the artificial powder medium field; and thirdly, it is adsorbed and filtered by the micro-adsorption field between the multi-layered fine-ultrafine pores in the artificial powder medium field. In the above three cases, the fine-ultrafine dust in the air can be filtered with high efficiency, so as to realize a high-level air cleaning.

Compared with the unitary filter cloth structure, the dual filter structure of the artificial powder medium field with filter cloth greatly improves the filtration precision. After considerable trials and field practice tests for more than 6 years, the improved filtration precision is summarized as follows:

| Filter Cloth Type of The Filter Cartridge | Filter precision (European standard) | |
| --- | --- | --- |
| | A Unitary Filter Cloth Filtering Structure | A Dual Filter Structure of a Dielectric Field and Filter Cloth |
| 6280# coated filter material | ≥0.4 μm, 99.771%, F9 | ≥0.3 μm, 99.99-99.999%, H13, H14 |
| 6277# coated filter material | ≥0.3 μm, 99.986%, H12 | ≥0.12 μm, 99.9995%, U15 |

As shown in the above table, for 6280 # coated filter material, the filtration precision is increased from ≥0.4 μm to ≥0.31 μm, and the filtration efficiency is increased from 99.771% to 99.999%, that is, from level F9 to level H13, H14 under the European standard, which is increased by 4 to 5 grades. As to the 6277 # coated filter material, the filtration precision is increased from ≥0.31 μm to ≥0.12 μm, and the filtration efficiency is increased from 99.986% to 99.9995%, that is, from level H12 to level U15 under the European standard, which is increased by 3 grades.

When the device of the present invention works in combination with the conventional high efficiency air filter, a higher air filtration level can be achieved, which makes the filtration precision ≥0.12 um, the filtration efficiency ≥99.999995% to reach level U17 or a higher level.

The second advantage of the invention is that the pressure difference control and the jet deashing technology are used to effectively reduce the operating energy consumption value. As stated above, a unitary air filtration initial resistance value of the bag filters or filter cartridges is 100 Pa; the resistance value of the artificial powder medium field is ranged from 100 to 500 Pa, and the optimal range is 150 Pa to 300 Pa; the resistance value of the air dust layer is ranged from 100 to 500 Pa, and the optimal range is 150 Pa to 300 Pa; the range of the initial resistance value and the final resistance value of the present invention is 300 to 1100 Pa, and the optimal range is 400 Pa to 700 Pa. Therefore, compared with the conventional air filtration mode (the greatest final resistance value is 1700 Pa), the resistance energy consumption value saved by the present invention is 600 to 1000 Pa, which means saving of 35-58% energy consumption.

The third advantage of the invention is that the pressure difference control, the jet deashing and the parallel combination technology are used to effectively improve the stability of the operation. On one hand, as stated above, the total resistance difference value range of the present invention is 0 to 800 Pa, and the optimal total resistance difference value range is 0 to 300 Pa. Compared with the conventional air filtration mode (0 to 1500 Pa), the total resistance difference value range of the present invention is reduced by 700 to 1200 Pa, and the narrowing rate is 46 to 80%, such that the operating stability of the present invention is effectively improved. On the other hand, a group of high efficiency air filter devices is composed of two or more of the high efficiency air filter devices communicated in parallel, such that the high efficiency air filter device group can continuously and stably perform air filtration.

The fourth advantage of the invention is to effectively improve the service life of the consumables by using the deashing and dual filtering structure technology. On one hand, in terms of the bag filters or filter cartridges of the present invention, due to the introduction of the high-pressure gas pulse jetting technology, the bag filters or filter cartridges have an automatic deashing function, which enables the bag filters or filter cartridges to be used repeatedly. In addition, due to the introduction of a dual filtration structure technology, the artificial powder medium field provides excellent mechanical and chemical protection for the bag filters or filter cartridges. Under the combined effect of these two factors, the service life of the bag filters or filter cartridges can be 210 years.

Moreover, in a case where the device of the present invention works in combination the conventional high efficiency air filter, compared with the filtration technical idea that "the filtration accuracy is improved step by step, and the dust filtration tasks of different particle levels are distributed to each stage from coarse to fine, and the responsibility is naturally and equally distributed" of the traditional air filtration mode, the filtration technical idea of the device of the present invention has the advantage of achieving efficient filtering at one time. The device of the present invention effectively filters the air, and rarely can dust pass through the device of the present invention to reach the conventional high efficiency air filter at the rear stage. Therefore, the rear-mounted conventional high conventional air filter can also have a service life of 110 years.

Certainly, the artificial powder medium is also a consumable. However, on one hand, since it can be replenished from the fine-ultrafine dust in the air, the total loss is small except for the first use. On the other hand, the artificial powder medium is relatively inexpensive, and the total cost is relatively low.

Comparing the consumable's service life of the combination of device of the present device and the rear-mounted conventional high efficiency air filter with that of the conventional 3-stage series combined air filtration mode the results are as follows:

| The Conventional 3-Stage Series Combined Air Filtration Mode (Unit: Month) | The Combination of Device of the Present Invention and the Rear-Mounted Conventional High Efficiency Air Filter (Unit: Month) | The Service Life of Consumable Materials Improved (times) |
| --- | --- | --- |
| First-stage primary-efficiency filtering unit: 1 | The filtering units of the bag filters or filter cartridges and the high efficiency air filter: ≥120 | 120 |
| Second-stage intermediate-efficiency filtering unit: 2-3 | | 40-60 |
| Third-stage high-efficiency filtering unit: 6 | | 20 |

As shown in the above table, the service life of consumables is increased by 20-120 times, with an average of 70 times.

The device of the invention is particularly applicable to air filtration in industrial, commercial and special occasions, such as air filtration in special environments such as central air conditioners of ultra-clean workshops, clean workshops, and other workshops, central air conditioners in office buildings, hotels and hospitals, and gas turbines, etc, thereby achieving good effects of high efficiency, low energy consumption, ultra stability, and long service life. Therefore, the existing high cost clean air filtration is turned into a kind of cheap consumption, which promotes the development and progress of industry, business, occupational safety and health environment as well as the air circulation industrial workshop.

The invention claimed is:

1. An air filter device, comprising an air filter system and a powder distribution system, wherein:
the air filter system comprises an air filter chamber, a clean air chamber, and pressurized jet pulse powder cleaning devices;
an entrance of the air filter chamber is in communication with an air inlet pipe;
an air inlet pipe valve is disposed on the air inlet pipe;
an exit of the clean air chamber is in communication with an air outlet pipe;
a pressure detector and an air outlet pipe valve are disposed on the air outlet pipe, and the air outlet pipe is in communication with an exhaust fan;
a plurality of bag filters or filter cartridges are disposed in the air filter chamber;
an opening end of each of the bag filters or filter cartridges is in communication with the clean air chamber, and each of the pressurized jet pulse powder cleaning devices is disposed above the opening end of the corresponding bag filter or filter cartridge;
a powder precipitation chamber is disposed at a lower end of the air filter chamber, and a powder discharge valve is disposed at a lower end of the powder precipitation chamber;
the powder distribution system comprises a powder storage tank filled therein with artificially prepared powder particles;
a pressurized air pipe is disposed in the powder storage tank;
the powder storage tank is in communication, via a powder delivery tube, with the air inlet pipe of the air filter chamber;
a pressurized air pipe valve is disposed at an air inlet end of the pressurized air pipe, and a powder delivery tube valve is disposed on the powder delivery tube, wherein the artificially prepared powder particles have a particle diameter that is greater than a filtration precision of a filter cloth of the bag filter or filter cartridge, the artificially prepared powder particles have a spherical shape and are capable of forming a medium layer on an outer surface of the bag filter or filter cartridge upon a powder distribution operation, wherein the medium layer is thickness-adjustable, and multi-layered,
wherein:
the powder delivery tube of the powder distribution system stretches into a middle position inside the air inlet pipe;
a nozzle is disposed at a powder outlet end of the powder delivery tube and is disposed facing a direction of an air flow entering into the air filter chamber, a powder jetting direction of the nozzle being opposite to the direction of the air flow; and a baffle is disposed in the powder jetting direction of the nozzle, such that jetted artificially prepared powder particles are distributed evenly in the air inlet pipe.

2. The air filter device according to claim 1, wherein the air filter system further comprises an air baffle disposed inside the air filter chamber and adjacent to the entrance of the air filter chamber, so as to disperse the artificially prepared powder particles in an air flow that enters the air filter chamber and the entrance of the air filter chamber, a trumpet-shaped air intake disposed at an air inlet of the air inlet pipe, and a filter mesh disposed on the air intake.

3. The air filter device according to claim 1, wherein the pressure detector, a switch of the air inlet pipe valve, a switch of the air outlet pipe valve, a switch of the pressurized air pipe valve, and a switch of the powder delivery tube valve are electrically connected to a PLC control system respectively.

4. The air filter device according to claim 1, wherein an air outlet of the exhaust fan is in communication with a second-stage air filter device.

\* \* \* \* \*